July 8, 1952     R. J. TRAINOR     2,602,479
CITRUS FRUIT JUICE EXTRACTOR

Filed Dec. 7, 1948     3 Sheets-Sheet 1

ROBERT J. TRAINOR,
INVENTOR.

BY Hazard & Miller
ATTORNEYS

July 8, 1952

R. J. TRAINOR 2,602,479

CITRUS FRUIT JUICE EXTRACTOR

Filed Dec. 7, 1948

ROBERT J. TRAINOR,
INVENTOR.

BY Hazard & Miller

ATTORNEYS

July 8, 1952 — R. J. TRAINOR — 2,602,479

CITRUS FRUIT JUICE EXTRACTOR

Filed Dec. 7, 1948 — 3 Sheets-Sheet 3

ROBERT J. TRAINOR,
INVENTOR.

BY Hazard & Miller
ATTORNEYS

Patented July 8, 1952

2,602,479

UNITED STATES PATENT OFFICE 2,602,479

CITRUS FRUIT JUICE EXTRACTOR

Robert J. Trainor, El Monte, Calif., assignor to Earle E. Crowe, El Monte, Calif.

Application December 7, 1948, Serial No. 63,887

6 Claims. (Cl. 146—3)

This invention relates to a citrus fruit juice extractor wherein citrus fruit are fed to the machine and automatically split into halves, reamed to obtain the juice which is discharged from the machine through one outlet, and the peels are discharged from another outlet.

A number of machines have heretofore been designed for accomplishing the same general purpose but these machines generally have been subject to the objection that they are difficult to clean after the juicing operation has been completed. The difficulty in cleaning the machine usually arises from the fact that shafts or other moving parts thereof are supported at opposite ends by bearing frames, walls or equivalent structures and the presence of these structures interferes with the cleaning operation.

A primary object of the present invention is to provide an improved machine of this character wherein the cup-providing means that provides the cups which receive the fruit halves as well as the reaming means which operate in conjunction therewith are all supported in an outboard manner, that is, on the ends of shafts or sleeves which ends are free or unsupported. By this arrangement the gearing or operating mechanism which rotates the cup-providing means and the reaming means can be located entirely behind a wall or partition and a removable transparent wall can be located forwardly of the cup-providing means and reaming means which will enable the operation of the machine to be watched at all times and on removal the various parts are largely exposed to facilitate cleaning.

In machines of this character due to the fact that they are designed to handle fruit that has been classified in several different sizes, it is frequently necessary to replace the cup-providing means from time to time so as to have cups of a size commensurate with the size of fruit that is being employed. The improved outboard arrangement greatly facilitates the removal and replacement of the cup-providing means in an axial direction inasmuch as the outer end of the shafts on which the cup-providing means are located are free and unsupported.

Ejectors are generally employed in conjunction with the cup-providing means to eject the reamed peels from the cups thereof. These ejectors are arranged to extend into grooves that traverse the cups of the cup-providing means. In effecting a removal and replacement of the cup-providing means it is necessary to remove the ejector from the cup-providing means to enable replacement. It is therefore another object of the present invention to provide a machine wherein the ejector is shiftably mounted on the machine to assume either a position wherein it will eject the peels from the cups or a non-operative position wherein it will not interfere with the removal and replacement of the cup-providing means.

With the foregoing and other objects in view, which will be made manifest in the following detailed description and specifically pointed out in the appended claims, reference is had to the accompanying drawings for an illustrative embodiment of the invention, wherein:

Figure 1:
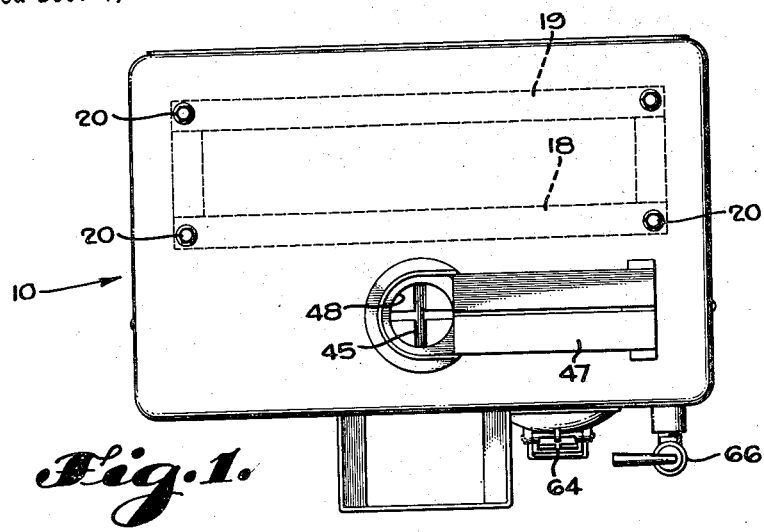
Figure 1 is a top plan view of the citrus fruit squeezing machine embodying the present invention.
Figure 2:
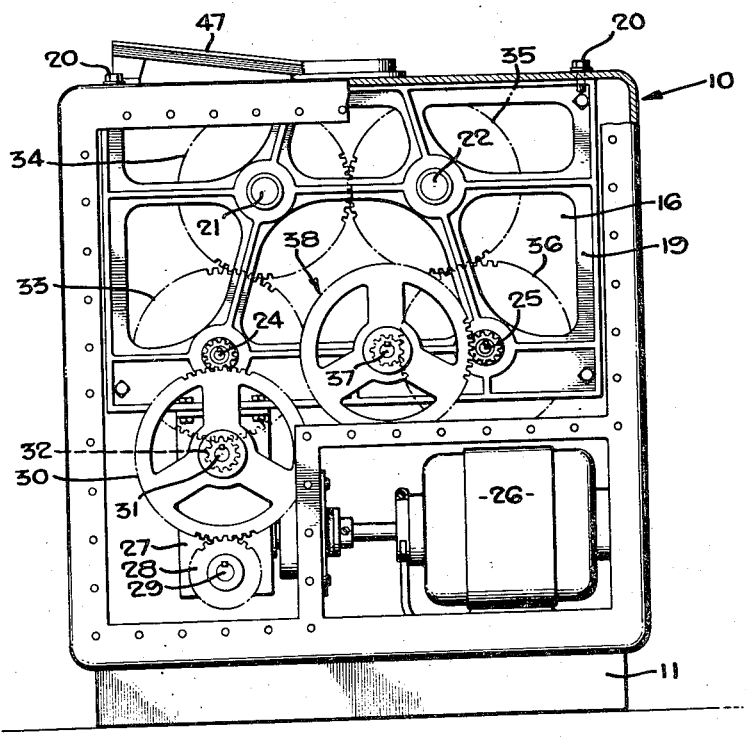
Fig. 2 is a rear view in elevation of the same, parts being broken away and shown in vertical section.

Referring to the accompanying drawings wherein similar reference characters designate similar parts throughout, the improved machine consists of an outer housing or case generally indicated at 10, having a base 11 and top, bottom and side walls. This case also provides a partial front wall 12 above which there is an opening that is normally closed by a removable transparent panel 13 disposed within a frame 14.

The interior of the case or housing is divided by means of a vertical wall or partition 15 into what may be regarded as a gearing compartment 16 and a squeezing compartment 17, it being understood that the fruit is divided and squeezed in the compartment 17 between the partition 15 and the wall formed by the partial front wall 12 and the panel 13.

Within the gearing compartment there are suspended front and rear frames 18 and 19. These frames may be suspended within the housing or case 10 such as by cap screws 20. They provide bearings for longitudinally extending shafts and sleeves. Thus near the top of the case 10 there are two parallel shafts 21 and 22 which are rotatable in bearings in both of the frames 18 and 19 and which project forwardly through the partition 15 and have their forward ends free or unsupported within the squeezing compartment 17. In a similar manner sleeves 23 are rotatably supported by the frames 18 and 19 and have their forward ends extended through the partition or wall 15 in such a manner as to be free or unsupported within the compartment 17. Shafts 24 and 25 are rotatably disposed within these sleeves and have their forward ends extend forwardly into the compartment 17. As a means for rotating these shafts and sleeves a motor 26 is disposed within the case 10 and through a gear box 27 drives a small gear 28 on a longitudinally extending shaft 29. This gear meshes with a larger gear 30 on a shaft 31 on the forward end of which there is a pinion 32. The gear 30 meshes with a pinion on the shaft 24 whereas the pinion 32 meshes with a gear 33 which is on the forward end of the sleeve 23 surrounding shaft 24. Gear 33 in turn meshes with a gear 34 and this gear in turn meshes with a gear 35. The gears 34 and 35 are keyed to the shafts 21 and 22, respectively. The gear 35 meshes with a gear 36 which is on the sleeve 23 that surrounds shaft 25. The gear 36 meshes with a pinion on a countershaft 37 on which there is a large gear 38 that meshes with the pinion on shaft 25. By this arrangement, when the motor 26 is operated, gear 30 will drive the shaft 24 at a relatively high rate of speed but pinion 32 will drive the gear 33 and its sleeve at a relatively low rate of speed. The four gears 33, 34, 35 and 36 are of equal diameter so that the two shafts 21 and 22 will be driven at equal rates of speed but in opposite directions. Similarly, the gears 33 and 36 will cause their sleeves 23 to rotate at the same rate of speed but in opposite directions, thus maintaining proper synchronism between the shafts 21 and 22 and the sleeves 23. The shafts 24 and 25 which rotate within the sleeves 23 will be driven at higher speeds in order to rotate the reamers at proper speed.

On the forward ends of the shafts 21 and 22 which are free or unsupported in the squeezing compartment 17 there are cup-providing means indicated at 39 and 40, respectively. These cup-providing means are in the form of circular castings or the equivalent which have generally hemispherical recesses 41 formed on their peripheries as illustrated. There are only two of such cups on each cup-provider arranged diametrically opposite each other. Each cup-provider is detachably secured on the forward end of its shaft such as by a cap or the equivalent, indicated at 42. On removal of this cap each cup-provider can be slipped axially off of the forward end of its shaft. Each cup-provider has an annular groove 43 formed therein which traverses or bisects the cups or recesses 41 formed therein. This groove is designed to receive a peel ejector 44 which, during rotation of the cup-providers, will pass behind the peels P disposed in the cups and eject the peels therefrom.

Figure 6:
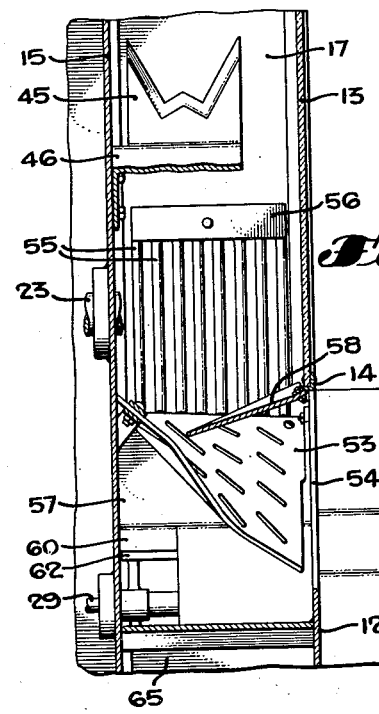
Fig. 6 is a partial view in vertical section taken substantially upon the line 6—6 upon Fig. 3.

Between the cup-providers there is arranged a vertical knife 45 the cutting edge of which is somewhat W-shaped, as illustrated in Fig. 6. This knife merges at its lower end with diverters 46 which are preferably not quite concentric with the cup providers. It is desirable to have the vertical length of the knife blade below the horizontal diameters of the cup-providers approximately equal to the diameter of the citrus fruit to be split. In this manner, by having a substantial vertical length of knife blade before the halves of the fruit encounter the diverters 46, the fruit may be split without tearing. The fruit F are fed to the machine by being passed down a suitable chute 47 and drop consecutively through an opening 48 in the top of the squeezing compartment 17. When opposed cups 41 on the cup-providers move towards each other these cups receive the fruit and pass it downwardly against the knife 45 and, as above explained, if the knife has a substantial vertical length the fruit will be cut thereby instead of having the lower portions of the halves spread apart which results in a tearing. The lower ends of the diverters 46 more nearly approach the peripheries of the cup-providers so that the halves will be effectively crowded thereby into the cups of the cup-providers.

Figure 3:
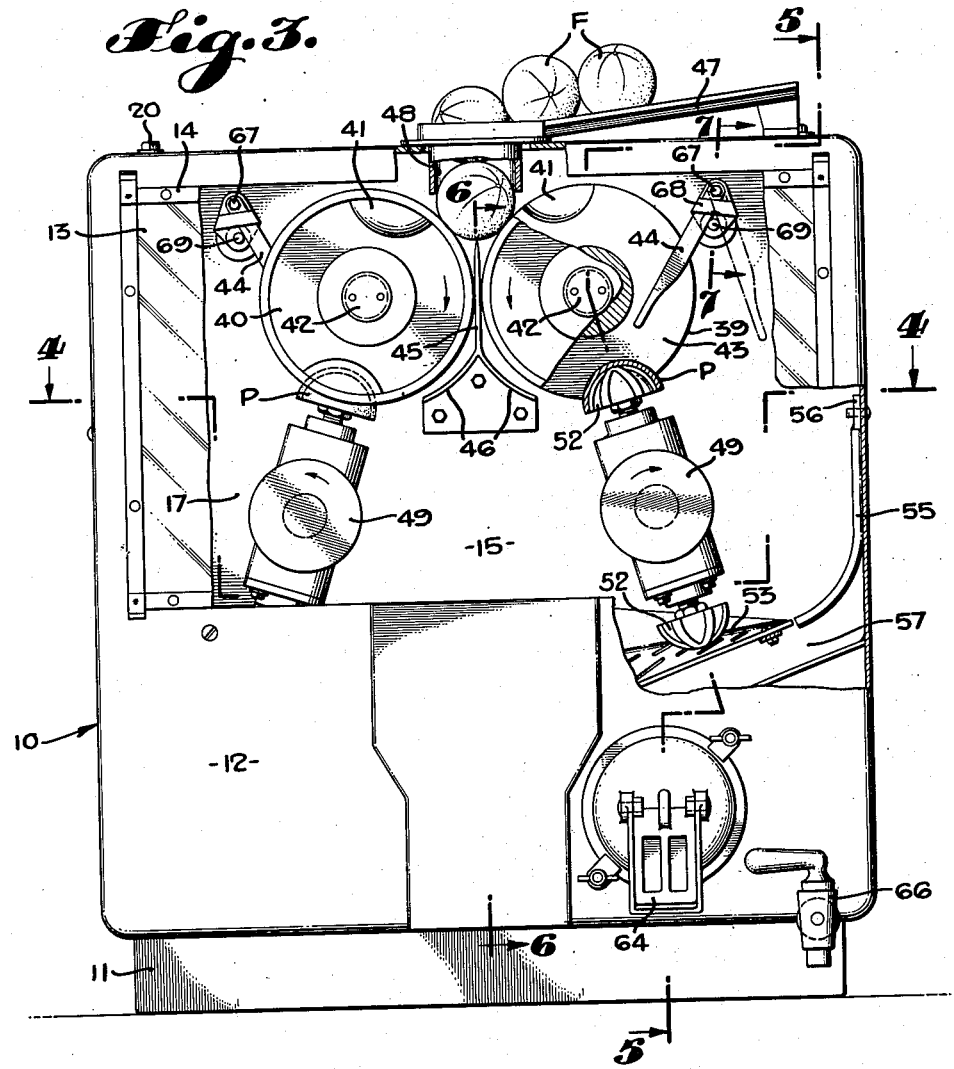
Fig. 3 is a view in front elevation of the same, parts being broken away and shown in vertical section.
Figure 7:
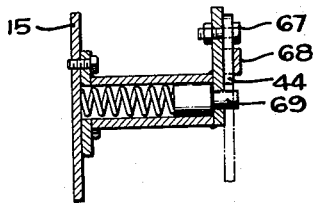
Fig. 7 is a sectional view taken substantially upon the line 7—7 upon Fig. 3.
Figure 4:
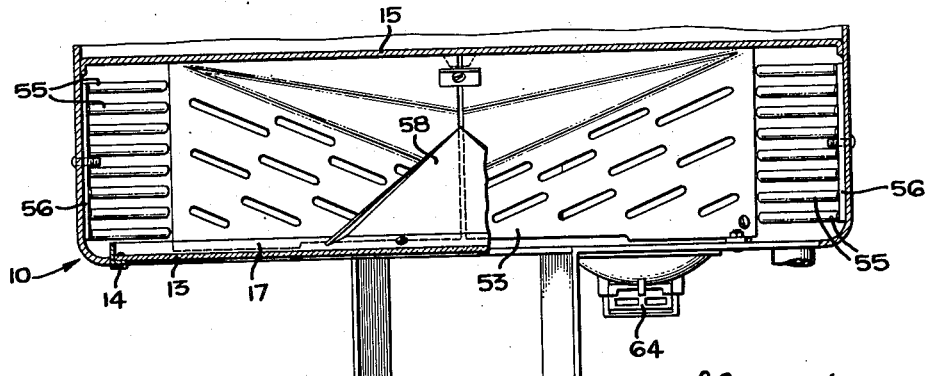
Fig. 4 is a horizontal section taken substantially upon the line 4—4 upon Fig. 3.
Figure 5:
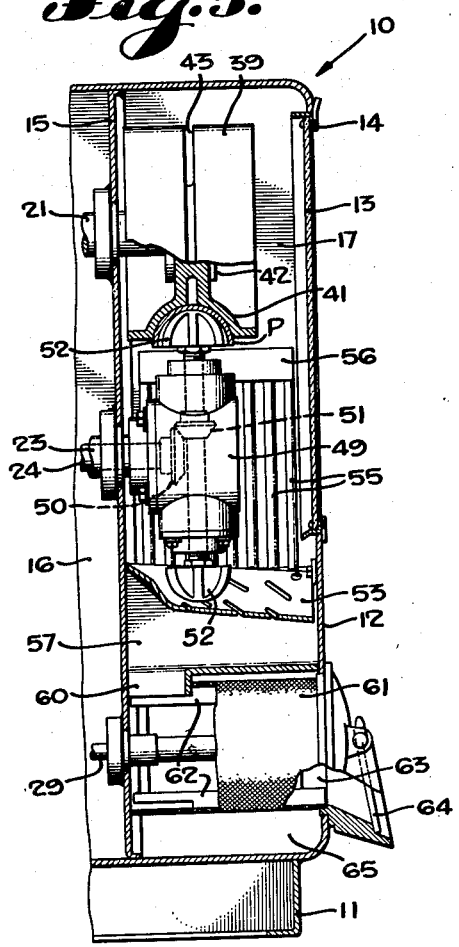
Fig. 5 is a vertical section taken substantially upon the line 5—5 upon Fig. 3.

The forward ends of the sleeves 23 carry reamer holders 49 which are in the form of housings rotated by the sleeves 23 in the directions indicated by the arrows on Fig. 3. The forward ends of the shafts 24 and 25 extend into these housings respectively and carry miter gears 50 which mesh with beveled pinions 51 on short shafts on which the reamers 52 are mounted. The sleeves 23 rotate in synchronism with the cup-providers and in the course of this rotation the reamers enter the cups as they pass beyond the lower ends of the diverters 46. The reamers are continuously rotated at relatively high speed about their respective axes due to the relatively high speeds of rotation of the shafts 24 and 25. Thus reaming the pulp from within the peels P continued rotation withdraws the reamers from the peels and the cup-providers carry the peels against the peel ejectors 44 so as to eject the peels from the cups.

The juice extracted descends by gravity onto a perforated plate 53 which is inclined downwardly and forwardly toward an outlet opening 54 in the partial front wall 12. At the sides of this plate there may be grates, indicated at 55, consisting merely of bars that are secured together by means of a top bar 56 and to the sides of the housing or case. These bars extend downwardly and inwardly toward the sides of the plate 53. The grates, together with the perforated plate 53, are designed to permit juice, small pieces of pulp, and seeds to pass therethrough into a lower juice compartment 57 disposed below the plate. The ejected peels fall by gravity onto the plate and are directed outwardly through the opening 54. Preferably a guard plate 58 is secured to the lower side of the frame 14 surrounding the transparent panel 13 which is designed to temporarily retard descent of the peels until any juice carried thereby has an opportunity to drain therefrom onto the plate 53 and pass through the perforations of the plate into the juice compartment.

The bottom of the juice compartment slopes toward an outlet 60 which discharges into a cylindrical screen 61. Within this screen, blades 62 which are carried by the forward end of shaft 29 wipe the interior of the screen. These blades are preferably helically formed so as to feed or work pulp and seeds through an outlet 63 normally closed by a gravity gate 64. The juice passing through the screen may be collected in a lower compartment 65 and released therefrom such as through a faucet or tap 66.

By means of this construction it will be appreciated that due to the outboard arrangement of the cup-providers and the reamers the operation of the machine can be seen at all times through the transparent panel 13. At the conclusion of a juicing operation, panel 13 is removed, which removes with it the guard plate 58, thus leaving the entire interior of the juice compartment exposed. Cleaning of the reamers and of the cup-providers is consequently greatly facilitated in that there are no interfering parts or walls to hinder or obstruct the cleaning operation.

In squeezing fruit of different sizes the cup-providers may have to be replaced from time to time to provide cups of the desired size. To this end the peel ejectors 44 are pivotally mounted as at 67 on brackets 68 that are mounted on the wall or partition 15. These brackets carry spring actuated plungers 69 which serve to hold the peel ejectors in either of the two positions illustrated in Fig. 3. When the peel ejectors are disposed in the full line position shown the spring actuated buttons 69 retain them in this position wherein they are traversing the groove 43 behind the cups. However, on depressing the spring actuated plungers or buttons it is possible to swing the peel ejectors into the dotted-line position shown, remote from the cup-providers. When the peel ejectors are in this position, on removing the cap 42 the cup-providers can be bodily removed in an axial direction from their respective shafts and replaced with other cup-providers having different sizes of cups which will properly handle the fruit to be squeezed. This operation can be very conveniently performed on merely removing the removable panel 13.

From the above described construction it will be appreciated that an improved citrus fruit squeezing machine has been developed which is highly advantageous in that the squeezing operation can be watched at all times through the panel 13. When the squeezing operation is completed the machine can be very easily and quickly cleaned as there are no interfering parts that will prevent washing of all surfaces on the interior of the squeezing compartment. Whenever it is necessary to change sizes of the cup-providers or reamers this is also easily accomplished on merely removing the panel 13 and swinging the peel ejectors into their inoperative positions.

While the machine disclosed herein shows each cup drum as having only two cups and corresponding reamers therefor, it will be appreciated that the number of cups may be increased if desired and that there may be a corresponding increase of reamers.

Various changes may be made in the details of construction without departing from the spirit and scope of the invention as defined by the appended claims.

I claim:

1. In a citrus fruit juice extractor, a wall, cup-providing means mounted for rotation in outboard relationship to said wall, reaming means mounted for rotation in outboard relationship to said wall for reaming fruit halves in the cup-providing means, a removable transparent panel disposed forwardly of the cup-providing means and the reaming means, means for ejecting peels from the cup-providing means, means for collecting the ejected peels and discharging them from the machine, said means being perforated for the passage of juice, and a guard plate carried by the transparent panel and disposed over the outlet for the ejected peels.

2. In a citrus juice extractor, a frame, a shaft rotatably mounted in the frame and having a portion extending from the frame in cantilever fashion, a cup-providing member on the outboard end of the shaft, means for releasably fastening the cup-providing member to the shaft to permit the cup-providing member to be removed off the end of the shaft, the cup-providing member having an annular groove traversing the cups, a peel ejector mounted on the frame for swinging movement optionally swingable to a position within the cup-providing member to eject peels or to a position without the cup-providing member to allow the cup-providing member to be axially removed, and a spring actuated button arranged in the path of the peel ejector for retaining the peel ejector in either of the above-mentioned positions and adapted to be depressed so as to be moved out of the path of the ejector to permit the ejector to be moved from one position to the other.

3. In a citrus fruit juice extractor, means providing a wall, a pair of shafts rotatably extending through the wall, complementary cup-providing members removably mounted on the outboard end of said shafts, sleeves rotatably extending through the wall, shafts rotatably supported within the sleeves, hollow reamer carriers mounted on the outboard ends of said sleeves, reamers, reamer shafts having the reamers mounted thereon, said reamer shafts being rotatably mounted in the hollow carriers, gearing connecting the shafts within the sleeves and the reamer shafts for rotating the reamers, means for synchronously rotating the sleeves and the first-named shafts to cause the reamers to enter the cup for reaming purposes and also to rotate the shafts within the sleeves, the cup-providing members having the cups thereof traversed by an annular groove, peel ejectors swingably mounted on the wall optionally movable to a position within the cup-providing members to eject peels or to a position without the cup-providing members to allow the cup-providing members to be axially removed, and spring actuated buttons arranged in the paths of the swingably mounted peel ejectors for retaining the ejectors in either of the above-mentioned positions adapted to be depressed to be moved out of the paths of the ejectors to permit the ejectors to be moved from one position to the other.

4. In a citrus juice extractor, a housing having a wall partitioning the housing into a front and back section, cup-providing means mounted for rotation in outboard relationship to said wall, reaming means mounted for rotation in outboard relationship to said wall for reaming fruit halves in the cup-providing means, the housing providing an opening forwardly of the cup-providing means and the reaming means, a window having inwardly extending side, top, and bottom flanges removably held within the opening by releasable means, said flanges deflecting juice away from the joint between the window and the housing, means for ejecting peels from the cup-providing means, another opening in the housing located forwardly and below the reaming means, means for guiding peels toward said another opening, and a juice deflector guard fastened to the window and removable therewith and disposed above said another opening to deflect juice away from said another opening.

5. In a citrus fruit juice extractor, a housing providing a front wall and an intermediate wall disposed behind the front wall and providing a compartment, cup-providing means removably mounted for rotation in outboard relationship to said intermediate wall and removable in a direction normal to the wall, reaming means removably mounted for rotation in outboard relationship to said intermediate wall for reaming fruit halves in the cup-providing means and being removable in a direction normal to the wall, a removable transparent panel in the front wall disposed forwardly of the cup-providing means and the reaming means and exposing both said means when removed, means for ejecting peels from the cup-providing means, said ejecting means being exposed when the panel is removed, inclined perforated plate means spanning the compartment in the area beneath the reaming means and cup-providing means and adapted to receive ejected peels and direct them toward an outlet from the housing, and means beneath the perforated plate means for receiving fruit juice passing through the perforated plate means and separating the juice from the seeds and pulp.

6. In a citrus fruit juice extractor, a housing providing a front wall and an intermediate wall disposed behind the front wall, cup-providing means mounted for rotation in outboard relationship to said intermediate wall, reaming means mounted for rotation in outboard relationship to said intermediate wall for reaming fruit halves in the cup-providing means, and a removable transparent panel in the front wall disposed forwardly of the cup-providing means and the reaming means and exposing both means when removed, said panel having inwardly directed side, top, and bottom flanges for deflecting juices away from the joint between the panel and the front of the housing.

ROBERT J. TRAINOR.

REFERENCES CITED

The following references are of record in the file of this patent:

UNITED STATES PATENTS

| Number | Name | Date |
|---|---|---|
| 1,386,552 | Carney | Aug. 2, 1921 |
| 2,065,271 | Faulds | Dec. 22, 1936 |
| 2,181,514 | Lachman | Nov. 28, 1939 |
| 2,199,876 | Brown | May 7, 1940 |
| 2,332,177 | Smith | Oct. 19, 1943 |